United States Patent
Gadd

(10) Patent No.: US 7,294,042 B2
(45) Date of Patent: Nov. 13, 2007

(54) METHOD AND APPARATUS FOR ABRASIVE RECYCLING AND WASTE SEPARATION SYSTEM

(75) Inventor: Michael William Gadd, Singapore (SG)

(73) Assignee: Jetsis International Pte Ltd, Singapore (SG)

( * ) Notice: Subject to any disclaimer, the term of this patent is extended or adjusted under 35 U.S.C. 154(b) by 0 days.

(21) Appl. No.: 11/638,278

(22) Filed: Dec. 12, 2006

(65) Prior Publication Data

US 2007/0093180 A1 Apr. 26, 2007

Related U.S. Application Data

(62) Division of application No. 10/500,418, filed as application No. PCT/SG02/00296 on Dec. 27, 2002, now Pat. No. 7,147,545.

(30) Foreign Application Priority Data

Dec. 28, 2001 (SG) .............................. 200108107-4

(51) Int. Cl.
*B24B 1/00* (2006.01)
*B24C 9/00* (2006.01)

(52) U.S. Cl. .......................................... 451/36; 451/88

(58) Field of Classification Search ................. 451/36, 451/38, 40, 60, 75, 87, 88
See application file for complete search history.

(56) References Cited

U.S. PATENT DOCUMENTS

| | | | |
|---|---|---|---|
| 3,713,499 A | 1/1973 | Arscott et al. | |
| 4,449,331 A | 5/1984 | MacMillan | |
| 5,049,260 A | 9/1991 | Spears | |
| 5,185,968 A | 2/1993 | Lyras | |
| 5,647,989 A | 7/1997 | Hayashi et al. | |
| 5,957,759 A | 9/1999 | Cardenas et al. | |
| 6,328,638 B1 | 12/2001 | Chin et al. | |
| 6,361,416 B1 * | 3/2002 | Hopkins et al. | 451/88 |
| 6,386,300 B1 | 5/2002 | Curlett et al. | |
| 6,805,618 B1 * | 10/2004 | Ward et al. | 451/87 |

FOREIGN PATENT DOCUMENTS

| | | |
|---|---|---|
| DE | 19843683 A1 | 3/2000 |
| EP | 0622121 A | 11/1994 |
| EP | 1034891 A | 9/2000 |
| GB | 1076922 A | 7/1967 |
| WO | 2000053382 A2 | 9/2000 |

* cited by examiner

*Primary Examiner*—Jacob K. Ackun, Jr.
(74) *Attorney, Agent, or Firm*—Wells St. John P.S.

(57) ABSTRACT

The present invention provides a method of handling abrasive solids materials used in an abrasive cutting procedure which jets a high-pressure abrasive slurry through a nozzle (7) onto a work piece over and/or in a catcher tank (8). This handling method includes catching the used abrasive slurry together with work piece kerf material in the catcher tank, and passing at least some abrasive solids collected in the catcher tank as a slurry to a partitioning apparatus which includes a vibratory sieve (27). The handling method also includes partitioning the slurry with the partitioning apparatus in order to provide at least two solids streams. One of the solid streams passes through the sieve and the other passes across the sieve whilst entrained as a slurry. The handling method further includes passing as a slurry to the nozzle (7) for jetting a pressurised or pressurisable slurry that has partitioned solids stream which has passed through the sieve (27).

5 Claims, 3 Drawing Sheets

METHOD AND APPARATUS FOR ABRASIVE RECYCLING AND WASTE SEPARATION SYSTEM

RELATED PATENT DATA

Figure 1:
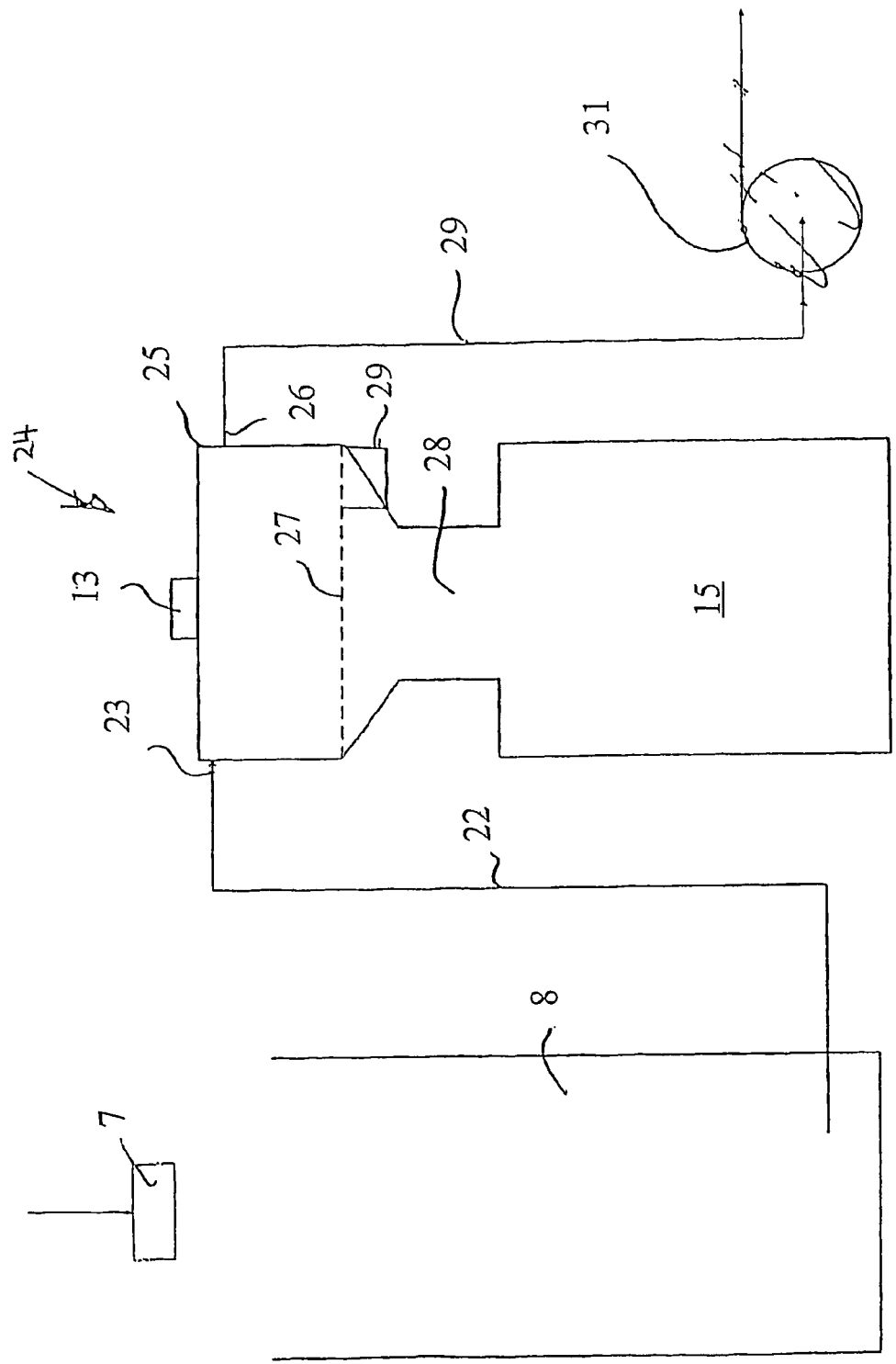

This application is a divisional of U.S. patent application Ser. No. 10/500,418, filed Feb. 18, 2005, now U.S. Pat. No. 7,147,545, which claims priority to Patent Cooperation Treaty application Serial No. PCT/SG02/00296, which was filed Dec. 27, 2002, and which claims priority to Singapore Application Serial No. 200108107-4, which was filed Dec. 28, 2001.

The present invention relates to materials handling and more particularly to any one or more of a method of partitioning solids of a slurry three ways, partitioning apparatus useful therefor, a method of handling abrasive solids materials so as to provide for at least a partial recycle of part thereof, a related abrasive slurry cutting plant and abrasive material prepared by such procedures for subsequent use.

In a jet cutting procedure a water jet customarily employs abrasive solids of a desirable size range, density, hardness and abrasiveness to enhance the erosion effect of the jet on a wide variety of work pieces that normally are interposed between the nozzle from which the jet issues and a catcher tank. Examples of the abrasive type materials used are aluminium oxide, garnet, copper slag, etc.

Examples of materials handling insofar as the abrasive components of plant and procedures in water jet systems include those disclosed in the 2000 publication of BHR Group entitled "Jetting Technology" pages 389 to 399.

It can be seen that such prior art systems have attempted to re-employ some of the abrasive caught by the catcher tank along with kerf from the work piece whilst rejecting solids of an undesirably small particle size. For this purpose one prior art procedure has employed both a hydro-cyclone and a sieve. Such hydro-cyclones are prone to wear with a result in significant maintenance costs which detracts from the cost saving recycle. Such wear in addition reduces performance and requires the use of large quantities of water.

Another system disclosed uses sieve screens (see www.easijet.com).

The present invention is directed to methods and apparatus having application in a partial recycle of abrasive materials used in a water jet cutting system which relies on a flow through over a sieve to achieve a partition of particles in the flow through or on the sieve not to be used through the nozzle from those that are to be so used. Such a procedure can remove oversized particles that might have a tendency to block the jetting nozzle and at the same time can ensure there is little use in the recycle of abrasive material or kerf material of too small a size to be useful.

The system also optionally lends itself to a makeup of abrasive materials in use throughout the overall system that does not undermine the value of the recycle procedure.

The handling system useful in such a jet cutting plant will have application elsewhere wherever a partitioning of solids entrained in a slurry at least two (and preferably three) ways is required. Therefore the partitioning apparatus and partitioning method of the present invention has wider applicability, eg; with any other liquid entrainment system.

It is an object of the present invention to provide apparatus and methods which meet at least some of the above-mentioned criteria.

In a first aspect the present invention consists in a method of handling abrasive solids materials used in an abrasive cutting procedure of a kind which, in use, jets a high pressure abrasive slurry through a nozzle onto a work piece over and/or in a catcher tank, the handling method comprising or including catching the used abrasive slurry together with work piece kerf material in said catcher tank, passing at least some of abrasive solids collected in the catcher tank as a slurry to a partitioning apparatus that includes a vibratory sieve, partitioning with said partitioning apparatus the slurry to provide at least two solids streams one of which passes through the sieve and one of which passes across the sieve whilst still entrained as a slurry, and passing as a slurry to the nozzle for jetting a pressurised or pressurisable slurry which includes partitioned solids stream that has passed through the sieve.

As used herein "slurry" refers to any liquid vehicle (whatever pressure) associated with solids e.g. such that when moving the liquid entrains the solids.

Preferably there is a partitioning of the solids by the partitioning apparatus three ways, the aforementioned two solids streams and oversized solids that drop from the slurry that passes across the sieve and are at least initially retained on the sieve.

Preferably the solids passed to the nozzle are in the size range of from 10% to 70% of nozzle diameter.

Preferably the passing as a slurry to the nozzle involves high pressure water expression from a pressure vessel.

Preferably said partitioning apparatus comprises or includes a housing having a first inlet, a first outlet, and a collection zone or second outlet, and a sieve disposed below said first inlet and said first outlet but above said collection zone or second outlet, and wherein said first inlet is to receive and pass the slurry at a rate and velocity into the housing above the sieve such that at least some of the liquid component(s) of the slurry will, as a flow through, entrain small and/or less dense solids out through said first outlet, and wherein the rate and velocity of intake into the housing via the first inlet above the sieve and the outflow via the first outlet is such as to enable at least some oversize solids to settle on the sieve (where they are of an appropriate density) and solids (not entrained out of said first outlet) of sufficient density and of a size less than that of the oversized material to pass down through the sieve.

Preferably said sieve is a directly or indirectly shaken and/or vibratory sieve.

Preferably said partitioning apparatus has a collection zone and there is a valved flow path therefrom to a pressure vessel from which, as required at the nozzle, high pressure water can express the solids stream to pass to the nozzle.

Preferably there is controllable liquid and/or slurry flow path from said pressure vessel back to said collection zone of the partitioning apparatus capable of moving as a slurry more solids from said collection zone through, via the valved flow path, to said pressure vessel.

Preferably there is included the step of providing a makeup feed of abrasive solids.

Preferably said makeup solids are introduced into said catcher tank.

Preferably there is provided a solids agitation water feed into the catcher tank.

Preferably there is an overflow out take of at least water from the catcher tank.

Preferably a control system reliant on at least one sensor provides a control of valves and pumps which determines the modes of operation of the system capable of performing the method.

In a second aspect the present invention consists in abrasive slurry cutting plant comprising or including an abrasive supply system, a catcher tank, a nozzle for jetting as a slurry abrasive solids onto any appropriately positioned work piece over and/or in the catcher tank, partitioning apparatus, apparatus on demand to provide a supply of high pressure water into said pressure vessel with an ability to express water and/or a slurry therefrom, apparatus to convey as a slurry caught solids from the catcher tank to said partitioning apparatus, apparatus to convey a useable abrasive solids stream as a slurry from the partitioning apparatus on demand to the pressurisable vessel, (optionally) apparatus on demand to provide a water feed to the catcher tank, (optionally) apparatus to provide, as part of the apparatus to convey a usable abrasive solids stream, a feed of water for the solids stream to pass from the partitioning apparatus to the pressure vessel, Preferably there is provided apparatus to provide a makeup feed of abrasive solids.

Preferably said makeup feed is a feed into said catcher tank.

Preferably the partitioning apparatus comprises or includes a housing having a first inlet, a first outlet, and a collection zone or second outlet, and a sieve disposed below said first inlet and said first outlet but above said collection zone or second outlet, wherein said first inlet is to receive and pass a slurry received from the catcher tank at a rate and velocity into the housing above the sieve such that at least some of the liquid component(s) of the slurry will, as a flow through, entrain a first part of the solids out through said first outlet, and wherein the rate and velocity of intake of the slurry into the housing via the first inlet above the sieve and the outflow via the first outlet is such as to enable at least some oversize material to settle on the sieve and at least some sieve passable solids of greater density than the entrained solids of the flow through to pass down through the sieve.

Preferably there is a said collection zone which is a reservoir from which the collected solids as a slurry on demand (optionally with the addition of additional water) can be fed as a slurry to said pressure vessel from whence the solids may be expressed to the nozzle under the action of high pressure water passing into such pressure vessel.

Preferably apparatus is included whereby said sieve, in use, vibrates and/or shakes.

In still a further aspect the present invention consists in partitioning apparatus capable of partitioning the solids of a slurry at least three ways, said apparatus comprising or including a housing having a first inlet, a first outlet, and a collection zone or second outlet, and a sieve disposed below said first inlet and said first outlet but above said collection zone or second outlet, wherein said first inlet is to receive and pass a slurry received from the catcher tank at a rate and velocity into the housing above the sieve such that at least some of the liquid component(s) of the slurry will, as a flow through, entrain a first part of the solids out through said first outlet, and wherein the rate and velocity of intake of the slurry into the housing via the first inlet above the sieve and the outflow via the first outlet is such as to enable at least some oversize material to settle on the sieve and at least some sieve passable solids of greater density than the entrained solids of the flow through to pass down through the sieve.

Preferably there is provided a drive whereby said sieve, in use, is capable of being actively shaken and/or vibrated and, in use, oversize material that settles on the sieve may migrate therefrom to an optional trap for such material.

Preferably said collection zone is a reservoir adapted so that collected solids as a slurry on demand (optionally with the addition of additional water) can be fed as a slurry to a pressure vessel.

In yet a further aspect the present invention consists in a method of partitioning solids of a slurry three ways, said method comprising providing a housing having an inlet, a first outlet, and a second outlet or collection zone, and, disposed therein, a sieve disposed below said first inlet and said first outlet but above said second outlet or collection zone, passing a slurry via said inlet into the housing across the sieve and, in part, out of said first outlet whilst at least some of the solids of the slurry fall onto and/or through the sieve, harvesting or using the solids that have passed through said sieve and out of said second outlet or into said collection zone, harvesting or removing those solids collected on the sieve, and harvesting or disposing of those solids that have passed out of said first outlet.

Preferably the harvesting or using of the solids that pass out of said second outlet or into said collection zone is as a slurry.

Preferably the harvesting or disposal of the solids that pass out of said first outlet is as a slurry.

Preferably the harvesting or using of the solids that pass through the sieve is by a slurry feed thereof from said collection zone or from said second outlet into a pressure vessel from whence the solids may be expressed under the action of water addition into such pressure vessel.

In still a further aspect the present invention consists in abrasive materials in a water slurry for use in a jet cutting procedure prepared for such use using an at least partial recycle procedure reliant on a method of the present invention.

Figure 2:
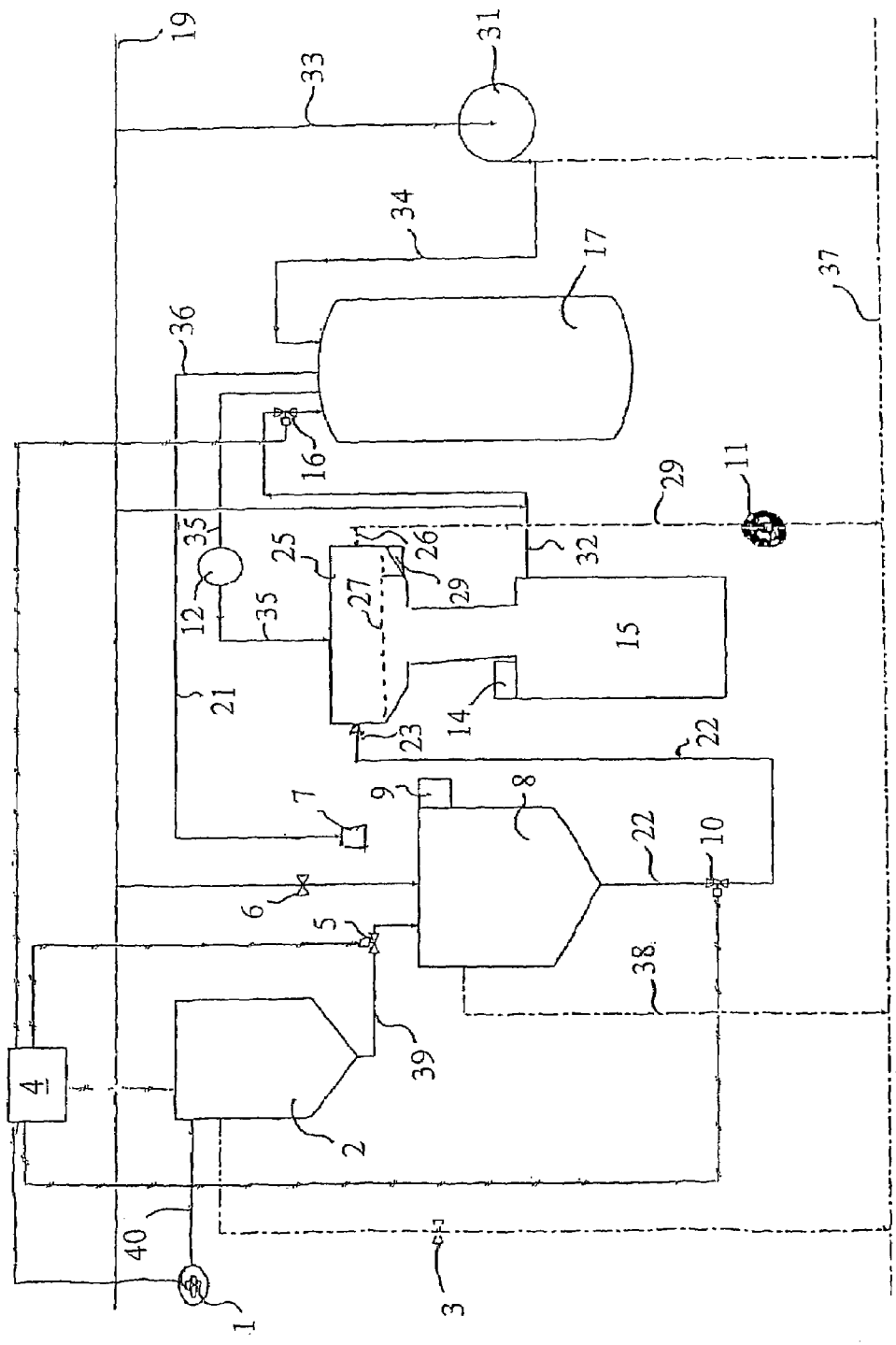
Figure 3:
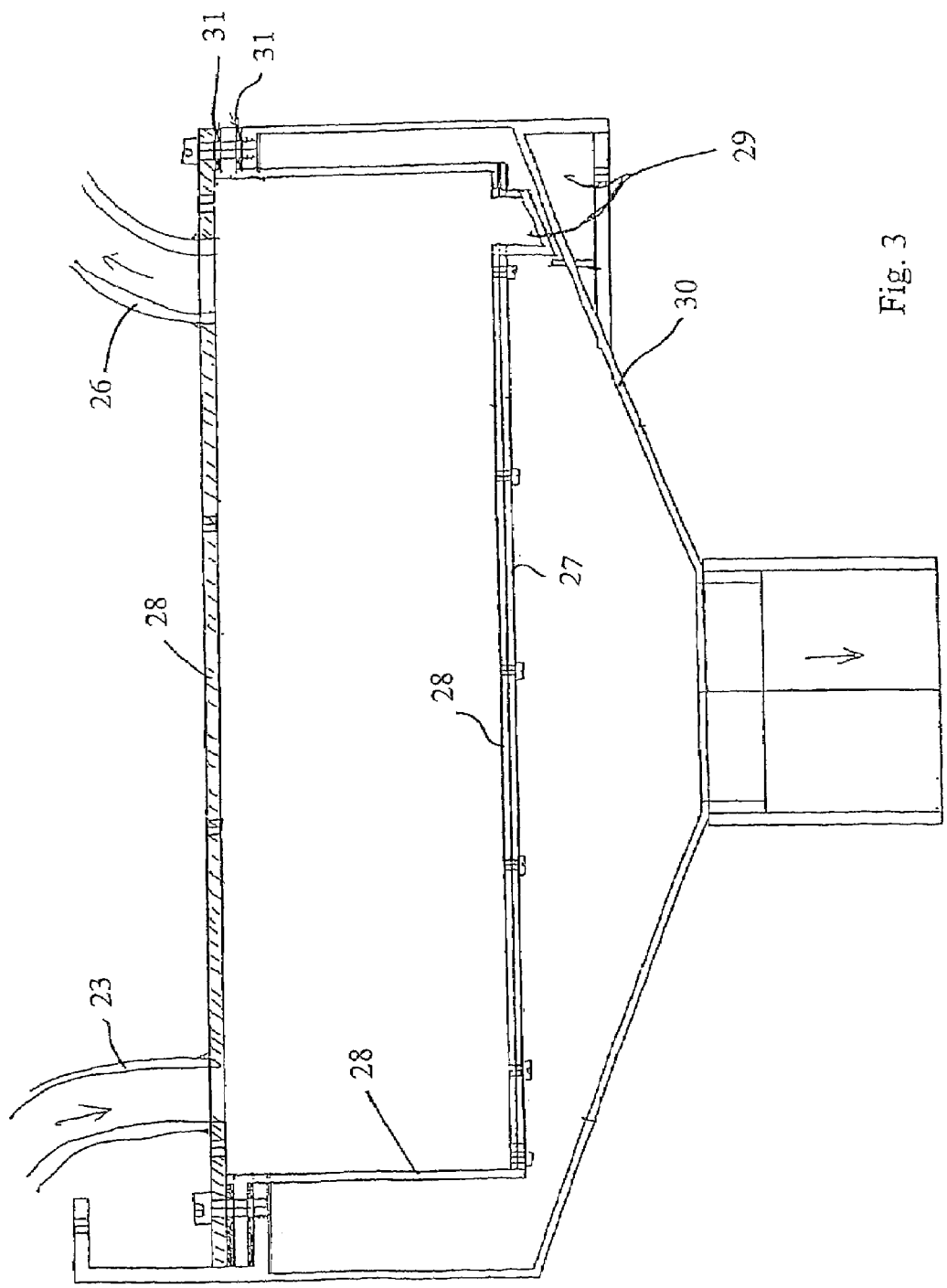

A preferred form of the present invention will now be described with reference to the accompanying drawings in which, FIG. 1 is a diagrammatic view showing a slurry jet issuing nozzle over a catcher tank from whence a fluid tight flow path exists to an inlet into partitioning apparatus having disposed within a housing thereof a sieve over a collection zone and under an outlet for flow through of part of the slurry above the sieve, FIG. 2 is a diagrammatic view of a whole abrasive jet cutting plant employing the arrangement substantially as disclosed in FIG. 1 showing appropriate controls, and FIG. 3 shows a preferred housing with sieve of a partitioning plant in cutaway perspective.

In the preferred form of the present invention a nozzle 7 is adapted to receive a slurry containing abrasive materials (preferably in a size range of from about 10% to about 70% of the nozzle diameter via a flow path 21 from a pressure vessel 17. The abrasive slurry from the nozzle 7 is jetted downwardly over the catcher tank 8.

The catcher tank 8 includes an isolation valve 9 capable of isolating the tank from the drain via flow path 38. There is a flow path 22 to an inlet 23 of the partitioning apparatus such as preferably disclosed in FIGS. 1 and 3. This flow path 22 includes a further catcher tank isolation valve 10.

The partitioning apparatus comprises a hopper 25 having an inlet 23 and an outlet 26 both above a sieve screen 27 capable of being shaken or vibrated actively above an outlet (the second outlet) 28 which leads to a collection zone 15.

The first outlet 26 forms part of a flow path 29 via a valve 29 to a drain or catchment.

The collection zone 15 includes a flow path therefrom 32 to the pressure vessel 17. That flow patch 32 is preferably valved by valve 16.

A low pressure water supply (for example 6 to 9 bar) 19 passes via a flow path 33, a pump 31, and a flow path 34 into the pressure vessel 17. As a consequence of use of pump 31 a high pressure water feed (for example, of from 690 to 1000 bar) which is sufficient pressure (when the valve 16 is closed and suction pump 12 is not operating on the flow path 35 back to the partitioning apparatus) to express an abrasive material laden slurry from tank 17 via the flow path 36 through the nozzle 7 as a jet.

The water supply 19 is capable of being introduced at valve 16 (eg; an electrical solenoid valve) into the flow path 32 as shown in FIG. 2.

A water and/or slurry return from pressure vessel 17 under the action of a vacuum pump 12 on flow path 35 into the catcher assists in providing the water requirements for a slurry best able to flow along the flow path 32 to the pressure vessel 17.

A air pressurising fan or pump 1 on a flow path 40 into make up tank 2 can force, when valve 5 allows and valve 3 is closed, make up abrasive into the catcher tank 8 via flow path 39 and, when valve 5 is closed and valve 3 is open, to the drain 37.

A drain is depicted generally as 37 and to this can be allowed to flow part of the water feed from the pump 31, the outflow of the undersize less dense materials from the partitioning apparatus (eg; under action of vacuum pump 30) and any water and light material outflow from the catcher tank 8 (via the flow path 38). In addition, if desired a make up abrasive material tank 2 can itself have an operable a feeder valve 5 to the catcher tank 8 where it blends make up feeds of abrasive with used abrasive (and kerf material from any work piece interposed between the slurry and the jet issuing nozzle 7).

A control panel 4 is electrically connected to at least valve 5, (optionally) valve 6, valve 10, valve 16, (optionally) vacuum pump 30, (optionally) pump 31, (optionally) pump 12, (optionally) air supply fan 1.

In operation the slurry passes thru nozzle 7 and cuts workpiece. The spent abrasive and workpiece waste falls into catch tank 8 below. The slurry pump 11 sucks the slurry from the catch tank 8 thru the sieve shaker 13. The small light particles of product waste and non-recyclable abrasive follows the flow out of the sieve shaker 13 to the slurry pump 11 and off to waste containment. The heavier and larger (recyclable) abrasive particles drop onto the sieve screen in the shaker. Any large scrap particles too big to pass thru the screen remains on top for collection, the remaining particles pass thru the screen and fill the hopper below. An abrasive height measurement device 14 inside the hopper sends a signal to the new abrasive feed valve 5 to add new abrasive into the catch tank when the level in the hopper 15 falls below a certain point. The new abrasive feed valve is fed with abrasive from the abrasive hopper 2 under pressure of air and feeds abrasive into the mix to replace the volume of abrasive that has passed straight thru the sieve shaker 13 to the slurry pump 11 and waste due to it being too fine to be recycled. This new abrasive mixes with the used slurry in the catch tank 15 and also passes together with it thru the sieve shaker removing any oversized abrasive.

When the pressure vessel 17 needs to refill itself another suction pump 12 sucks water from the vessel and creates a vacuum which then draws abrasive laden slurry from the hopper 15 into the vessel 17. The heavy abrasive settles into and fills the vessel whilst the rest of the water passes thru the slurry pump 12 and is pumped back into the sieve shaker.

A preferred form will now be described with reference to the FIG. 3.

FIG. 3 shows in cross section the inlet 23 being a 15 mm diameter inlet and the outlet 26 as a 15 mm diameter outlet both positioned about 100 mm above the sieve 27 which in one form of the present invention is a 150 U.S. mesh standard sieve adapted to allow through particles below 0.15 mm in size with such a sieve and such inlet/outlet configuration preferably distance across the housing 25 between the first inlet or inlet 23 and the first outlet 26 is approximately 250 mm.

We have determined that where a slurry having abrasive materials and kerf therein with a solids content of 0.3 kg/min at a flow rate of 2 liters/min is introduced by the inlet 23 there is, in steady state conditions, an outflow of about 2 liters/min via the outlet 26 with the outcome that most of the oversized materials, (ie; above 0.15 mm in particle size of sufficient density) are collected on the screen 27 carried under a removable assembly 28 (the removal of preferably also removes an optional trap 29 to which above 0.15 mm particles migrate under the effect of flow and vibration) and most of the other particles sizes (ie; below 0.025 mm particle size) exit via the outlet 26 whilst the remainder settles into the collection zone 15 from whence it can be reused.

That proportion of material wrongly passing through to the outlet 26, (ie; is material that should have reached collection zone 15) is not greater than about 5% w/w and that material that should have passed out of the outlet 26 (ie; undesirable lighter or smaller abrasive particles) but which is collected in collection zone 15 is no more than about 5% w/w.

It has been found that the three way partitioning can be achieved by the methods and apparatus of the present invention for various slurries and various rates of flow thereof by appropriate tuning to geometry (e.g. inlet with respect to screen and outlet) and screen size.

It is appropriate to ensure with geometry of the apparatus and flow rates that the slurry transit times in flow through from inlet 23 to outlet 26 is such that it is higher than the settling out time of those small particles to be excluded from the collection zone.

With the arrangement of FIG. 3 oversized materials collecting on the screen will naturally migrate to a catchment area at the end of the sieve and can be periodically removed (eg; with screen removal and replacement) or preferably can be collected in a trap peripherally of the screen (ie; they migrate under the shaking of the screen [e.g. by some eccentric mass (not shown) acting on the member 30] and/or with effect of the flow through) from whence they can be removed. To enhance this effect the sieve or screen 27 can slope slightly to trap 29 and the sieve carrying assembly 28 can be resiliently mounted relative to member 30 reliant on rubber bushes 31.

What is claimed is:

1. A method of partitioning solids of a slurry three ways, said method comprising providing a housing having an inlet, a first outlet, and a collection zone, and, disposed therein, a sieve disposed below said first inlet and said first outlet but above said collection zone,
    passing a slurry via said inlet into the housing across the sieve and, in part, out of said first outlet whilst at least some of the solids of the slurry fall onto and/or through the sieve,
    harvesting or using the solids that have passed through said sieve and into said collection zone,
    harvesting or disposing of those solids that have passed out of said first outlet,
    wherein said housing includes a second outlet via which a removing of those solids collected on the sieve occurs.

2. A method as claimed in claim 1 wherein the harvesting or using of the solids that pass out of said second outlet or into said collection zone is as a slurry.

3. A method as claimed in claim 1 wherein the harvesting or disposal of the solids that pass out of said first outlet is as a slurry.

4. A method as claimed in claim 1 wherein the harvesting or using of the solids that pass through the sieve is by a slurry feed thereof from said collection zone or from said second outlet into a pressure vessel from whence the solids may be expressed under the action of water addition into such pressure vessel.

5. A method of claim 1 wherein said slurry to be partitioned includes solids for recycle use in an abrasive water jetting system.

* * * * *